(12) United States Patent
Heng et al.

(10) Patent No.: US 9,293,925 B2
(45) Date of Patent: Mar. 22, 2016

(54) CHARGING AND POWER SUPPLYING CIRCUIT, METHOD AND APPLICATION DEVICE

(71) Applicant: HiSilicon Technologies Co., Ltd., Shenzhen (CN)

(72) Inventors: Caofei Heng, Chengdu (CN); Pengfei Wang, Shenzhen (CN); Jianping Wang, Chengdu (CN); Hang Cheng, Chengdu (CN)

(73) Assignee: HISILICON TECHNOLOGIES CO., LTD., Shenzhen (CN)

( * ) Notice: Subject to any disclaimer, the term of this patent is extended or adjusted under 35 U.S.C. 154(b) by 774 days.

(21) Appl. No.: 13/644,317

(22) Filed: Oct. 4, 2012

(65) Prior Publication Data
US 2013/0270907 A1 Oct. 17, 2013

(30) Foreign Application Priority Data
Nov. 14, 2011 (CN) .......................... 2011 1 0359733

(51) Int. Cl.
*H02J 3/14* (2006.01)
*H02J 4/00* (2006.01)
*H02J 7/00* (2006.01)

(52) U.S. Cl.
CPC ................. *H02J 4/00* (2013.01); *H02J 7/0072* (2013.01); *H02J 2007/0062* (2013.01); *Y02B 40/90* (2013.01); *Y10T 307/406* (2015.04)

(58) Field of Classification Search
CPC .................................. H02J 4/00; H02J 7/0072
USPC .............. 307/31, 66; 320/128, 135, 136, 145
See application file for complete search history.

(56) References Cited

U.S. PATENT DOCUMENTS

| 6,507,172 | B2 | 1/2003 | Sherman et al. | |
| 7,710,079 | B2* | 5/2010 | Martin | H02J 7/0068 320/145 |
| 2005/0180067 | A1* | 8/2005 | Zhang | H02J 7/0047 361/18 |
| 2011/0316488 | A1* | 12/2011 | Lueger | H02J 7/0072 320/164 |
| 2013/0015822 | A1* | 1/2013 | Kung | H02J 7/34 320/145 |

* cited by examiner

*Primary Examiner* — Thienvu Tran
*Assistant Examiner* — Rasem Mourad
(74) *Attorney, Agent, or Firm* — Brinks Gilson & Lione

(57) ABSTRACT

Embodiments of the present invention provide a charging and power supplying circuit, method and application device, which relate to the field of smart charging, so as to improve efficiencies of battery charging and system power supplying. The charging and power supplying circuit includes a power supplying tributary and a charging tributary. An end of the power supplying tributary is connected to a power supply, and another end is connected to a system. An end of the charging tributary is connected to the power supply, and another end is connected to a battery. A first transistor, a second transistor, a third transistor, a first amplifier, a second amplifier, a third amplifier, a fourth amplifier, a first comparator, a second comparator, a charging controller, a logical switch, an adder and a first control module are connected to the power supplying tributary and the charging tributary.

14 Claims, 14 Drawing Sheets

When a first comparator finds, through comparison, that a sum of a voltage of a power supplying tributary and a voltage of a charging tributary is less than a fifth preset level, the first comparator and a second comparator control a second line selection end of a logical switch to connect a gate of a first transistor to make the first transistor fully switched on; and meanwhile, when a voltage signal at a cathode of an input end of a second amplifier is less than a second preset level at an anode of the input end, a charging controller controls, according to output signals of a third amplifier and a fourth amplifier, a battery to undergo charging at a constant voltage and a constant current ⟵ S1501

When the first comparator finds, through comparison, that the sum of the voltage of the power supplying tributary and the voltage of the charging tributary is greater than or equal to the fifth preset level and meanwhile, the voltage signal at the cathode of the input end of the second amplifier is greater than or equal to the second preset level at the anode of the input end, the second amplifier controls the charging controller to gradually decrease a charging current of the battery ⟵ S1502

When the second comparator finds, through comparison, that the voltage of the charging tributary is less than or equal to a sixth preset level, the first comparator and the second comparator control a first line selection end of the logical switch to connect the gate of the first transistor, so as to limit a power supplying current of a system to a maximum output current limit ⟵ S1503

FIG. 15

CHARGING AND POWER SUPPLYING CIRCUIT, METHOD AND APPLICATION DEVICE

CROSS-REFERENCE TO RELATED APPLICATIONS

This application claims priority to Chinese Patent Application No. 201110359733.0, filed on Nov. 14, 2011, which is hereby incorporated by reference in its entirety.

FIELD OF THE INVENTION

The present invention relates to the field of smart charging, and in particular, to a charging and power supplying circuit, method and application device.

BACKGROUND OF THE INVENTION

For a device that supports both power supplying by a rechargeable battery and direct power supplying by a power supply (for example, a mobile electronic device such as a mobile phone and a portable instrument), when the device with the rechargeable battery is connected to a power supply (for example, a universal serial bus USB or power adapter), the power supply charges the battery and supplies power to the system simultaneously through a charging and power supplying circuit. With increase of the system power consumption of the device, the efficiencies of battery charging and system power supplying become more and more important. Specifically, the higher the efficiencies of system power supplying and battery charging are, the smaller the loss in the system power supplying and battery charging is, and the less the heat a chip produces. In this way, the service life of the device is prolonged, and the difficulty of designing a heat dissipation structure of a board-level system is reduced. In addition, the improved efficiencies of battery charging and system power supplying also help to prolong the service life of the battery.

Currently, the following three types of common charging and power supplying circuits are mainly used.

In a charging and power supplying circuit shown in FIG. 1, a power supply (USB or power adapter) 11 charges a battery and supplies power to a system simultaneously through a charging control chip (not shown in FIG. 1), and the system 14 is directly connected to the battery 13.

With such a charging and power supplying circuit, once the battery 13 is installed in the device, the system 14 is powered only by the battery 13, and the battery 13 discharges while being charged. As a result, the charging time of the battery 13 is prolonged and the charging is repeated, which leads to low efficiency of battery charging and reduces the service life of the battery 13. In addition, in this solution, if a charger 12 is a linear charger, both the charging efficiency and the power supplying efficiency are very low.

FIG. 2 shows a currently prevalent charging and power supplying circuit. In the circuit, a power supply (USB or power adapter) 21 charges a battery 23 and supplies power to a system 24 respectively through a charging control chip (not shown in FIG. 2). An end of an LDO (Low Dropout regulator, low dropout regulator)/switch 25 is connected to the power supply, and another end is connected to a first end of a linear charger 22 and to the system 24. A second end of the linear charger 22 is connected to the battery 23.

In this solution, the linear charger 22 is adopted for charging the battery 23, so both the charging efficiency and the power supplying efficiency are very low.

FIG. 3 shows a charging and power supplying circuit that is mainly recommended in the industry currently. As shown in FIG. 3, a power supply (USB or power adapter) 31 is connected to an input end of a BUCK circuit (buck converter circuit) 35, and an output end of the BUCK circuit 35 is connected to a system 34 and a source of a system load switch 32 respectively. A drain of the system load switch 32 is connected to a battery 33. In this solution, a switch circuit is adopted to provide a total current for the charging tributary and the system power supplying tributary, and the system load switch 32 is mainly utilized to perform linear control on the charging for the battery 33. Through loop control, the voltage on the system 34 follows the voltage of the battery 33 to improve the charging efficiency.

The defects lie in that, because the switch circuit supplies power to the system, the efficiency of the switch circuit is the efficiency of supplying power to the system 34; and the range of variation of the load is wide so the average efficiency is low. The efficiency of charging the battery 33 depends on a product of the efficiency of the switch circuit and the efficiency of the system load switch 32. Because the efficiency of the load switch 32 is less than 1, the charging efficiency is always lower than the efficiency of the switch circuit.

It can be seen that, charging technical solutions in the prior art can hardly overcome the low efficiencies of battery charging and system power supplying.

SUMMARY OF THE INVENTION

Embodiments of the present invention provide a charging and power supplying circuit, method and application device for a rechargeable battery, so as to improve efficiencies of battery charging and system power supplying.

To achieve the foregoing objective, the embodiments of the present invention employ the following technical solutions.

In one aspect, a charging and power supplying circuit is provided, which includes a power supplying tributary and a charging tributary, where an end of the power supplying tributary is connected to a power supply, and another end is connected to a system; an end of the charging tributary is connected to the power supply, and another end is connected to a battery.

A first transistor is connected to the power supplying tributary, and a source and a drain of the first transistor are connected to the power supplying tributary, and a gate of the first transistor is connected to a line selection end of a logical switch.

A second transistor is connected to the charging tributary, and a source and a drain of the second transistor are connected to the charging tributary, and a gate of the second transistor is connected to an output end of a charging controller.

A source and a drain of a third transistor are connected to the battery and the system respectively, and a gate of the third transistor is connected to a first control module.

Two signal input ends of the logical switch are connected to an output end of a first comparator and an output end of a second comparator respectively, a first line selection end of the logical switch is connected to an output end of a first amplifier, and a second line selection end is connected to a switch-on control end.

Three input ends of the charging controller are connected to an output end of a second amplifier, an output end of a third amplifier and an output end of a fourth amplifier respectively.

The charging and power supplying circuit further includes an adder, where a voltage of the power supplying tributary is input to a first input end of the adder, a voltage of the charging tributary is input to a second input end, and an output of the adder is a sum of the voltage of the power supplying tributary and the voltage of the charging tributary.

A first preset level is input to an anode of an input end of the first amplifier, and a cathode of the input end of the first amplifier is connected to the output end of the adder and the sum of the voltage of the power supplying tributary and the voltage of the charging tributary is input to the cathode.

A second preset level is input to an anode of an input end of the second amplifier, and a cathode of the input end of the second amplifier is connected to the output end of the adder and the sum of the voltage of the power supplying tributary and the voltage of the charging tributary is input to the cathode.

The voltage of the charging tributary is input to a cathode of an input end of the third amplifier, and a third preset level is input to an anode of the input end of the third amplifier.

A component voltage of the battery is input to a cathode of an input end of the fourth amplifier, and a fourth preset level is input to an anode of the input end of the fourth amplifier.

An anode of an input end of the first comparator is connected to the output end of the adder and the sum of the voltage of the power supplying tributary and the voltage of the charging tributary is input to the anode, and a fifth preset level is input to a cathode of the input end of the first comparator.

A sixth preset level is input to an anode of an input end of the second comparator, and a cathode of the input end of the second comparator is connected to the second input end of the adder and the voltage of the charging tributary is input to the cathode.

In another aspect, an application device of a charging and power supplying circuit is provided, which includes any charging and power supplying circuit described above.

In still another aspect, a charging and power supplying method is provided, which includes:

when a first comparator finds, through comparison, that a sum of a voltage of a power supplying tributary and a voltage of a charging tributary is less than a fifth preset level, connecting a second line selection end of a logical switch to a gate of a first transistor to make the first transistor on; and meanwhile, when voltage signals of two input ends of a second amplifier are not equal, controlling, by a charging controller, a second transistor to be on, and controlling, by the charging controller and according to output signals of a third amplifier and a fourth amplifier, a battery to undergo charging at a constant voltage and a constant current;

when the first comparator finds, through comparison, that the sum of the voltage of the power supplying tributary and the voltage of the charging tributary is greater than or equal to the fifth preset level and meanwhile, the voltage signals of the two input ends of the second amplifier are equal, controlling, by the charging controller, switch-off of the second transistor; and when a second comparator finds, through comparison, that the voltage of the charging tributary is less than or equal to a sixth preset level, connecting a first line selection end of the logical switch to the gate of the first transistor, so as to limit a power supplying current of a system to a maximum output current limit.

Through the charging and power supplying circuit, method and application device provided by the embodiments of the present invention, in the charging and power supplying circuit, the logical switch selects a line according to the voltage of the power supplying tributary and the voltage of the charging tributary, and controls the first transistor to be in a fully switched-on state or a current-limited state; the charging controller selects, according to the sum of the voltage of the power supplying tributary and the voltage of the charging tributary, switch-on/off of the second transistor to control the current of the charging tributary. In this way, the first transistor is a current-limiting switch for supplying power to the system. In comparison with the prior art in which the current-limiting switch is located in a trunk of the charging and power supplying circuit, the first transistor of the charging and power supplying circuit provided by the embodiments of the present invention is located in the power supplying tributary of the system, so that a current on the current-limiting switch reduces to a current of the power supplying tributary of the system. Because the first transistor is switched on in a lowest on-resistance state, the resistance of the first transistor is tiny in comparison with a load resistance, the power supplying loss of the system is only the loss of the power supplying current of the system on the first transistor, and the efficiency of system power supplying approximates 100%. Meanwhile, because the loss of the charging tributary of the battery is fully the loss on the switch circuit, and the loss on the switch circuit itself is tiny, the efficiency is very high. Therefore, in comparison with the existing solutions, both the efficiency of system power supplying and the efficiency of battery charging are improved significantly.

BRIEF DESCRIPTION OF THE DRAWINGS

To illustrate technical solutions in embodiments of the present invention or in the prior art more clearly, accompanying drawings to be used in the description of the embodiments or the prior art are introduced briefly below. Apparently, the accompanying drawings in the following description are only some embodiments of the present invention, and persons of ordinary skill in the art can derive other drawings from these accompanying drawings without making creative efforts.

FIG. 15 is a flowchart of a charging and power supplying method provided in an embodiment of the present invention.

DETAILED DESCRIPTION OF THE EMBODIMENTS

Technical solutions in embodiments of the present invention are described clearly and completely in the following in conjunction with the accompanying drawings in the embodiments of the present invention. Evidently, the embodiments to be described are merely part rather than all of the embodiments of the present invention. All other embodiments derived by persons of ordinary skill in the art based on the embodiments of the present invention without making creative efforts shall fall within the protection scope of the present invention.

It should be noted in advance that a voltage of a charging tributary mentioned in the following embodiments refers to a voltage corresponding to a current of the charging tributary, and a voltage of a power supplying tributary refers to a voltage corresponding to a current of the power supplying tributary. A voltage corresponding to a current may be a voltage generated when the current passes through a standard load, or a voltage obtained when the current passes through a standard I/V converter. For example, a maximum output current limit of a power supply is 250 mA and the standard load is 4Ω, and therefore, a voltage corresponding to the maximum output current limit of the power supply is 1 V. Also, when the maximum output current limit of the power supply is 250 mA, the voltage corresponding to the maximum output current limit of the power supply may be obtained through a standard I/V converter. I/V conversion in all the embodiments of the present invention is of a uniform standard, and the I/V converters mentioned in the following embodiments are of a uniform specification. The uniform standard may be set by a person.

Figure 1:
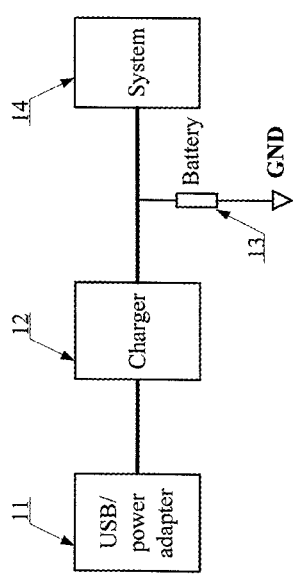
FIG. 1 is a schematic connection diagram of a charging and power supplying circuit provided in the prior art.
Figure 2:
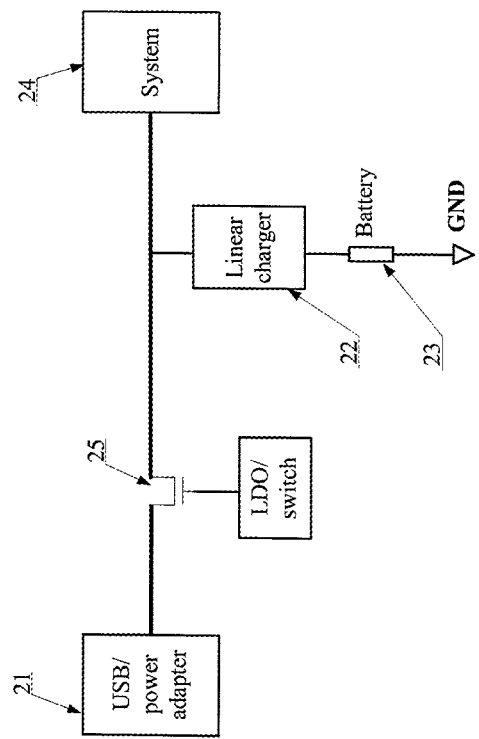
FIG. 2 is a schematic connection diagram of another charging and power supplying circuit provided in the prior art.
Figure 3:
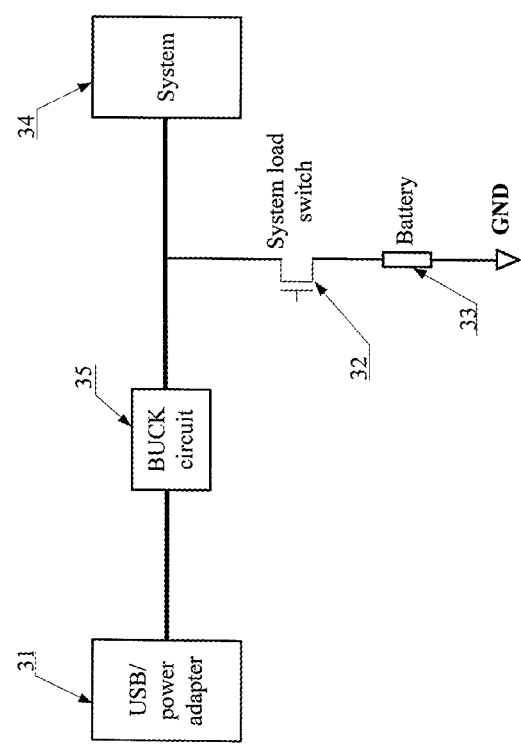
FIG. 3 is a schematic connection diagram of still another charging and power supplying circuit provided in the prior art.
Figure 4:
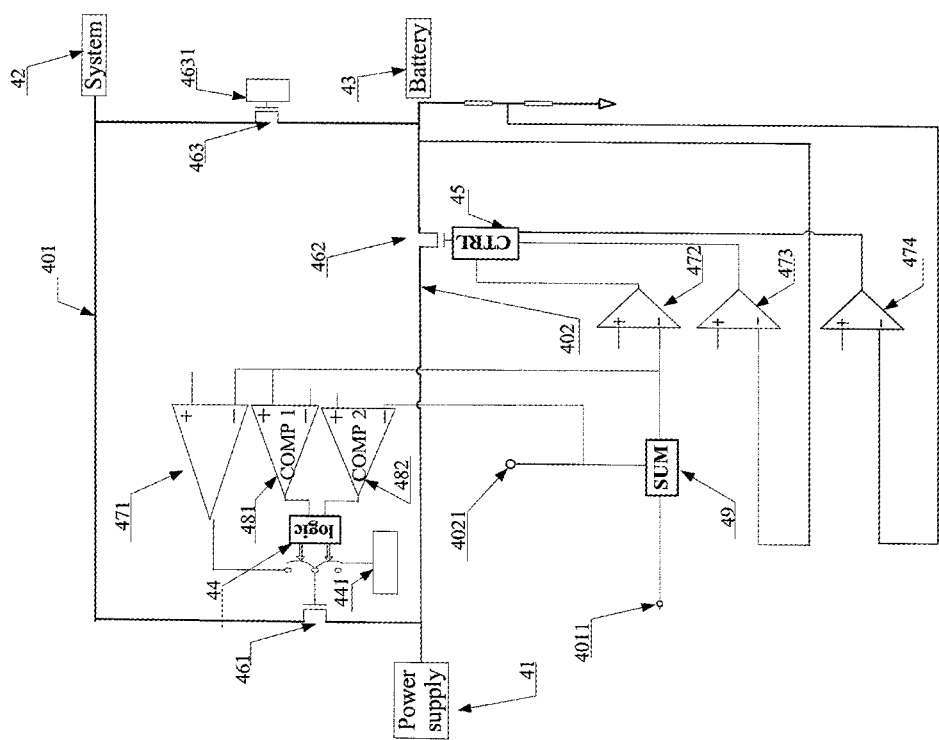
FIG. 4 is a schematic connection diagram of a charging and power supplying circuit provided in an embodiment of the present invention.

As shown in FIG. 4, a charging and power supplying circuit provided in an embodiment of the present invention includes:

a power supplying tributary 401 and a charging tributary 402, where an end of the power supplying tributary 401 is connected to a power supply 41, and another end is connected to a system 42; an end of the charging tributary 402 is connected to the power supply 41, and another end is connected to a battery 43.

A first transistor 461 is connected to the power supplying tributary 401, and a source and a drain of the first transistor 461 are connected to the power supplying tributary 401, and a gate of the first transistor 461 is connected to a line selection end of a logical switch 44.

A second transistor 462 is connected to the charging tributary 402, and a source and a drain of the second transistor 462 are connected to the charging tributary 402, and a gate of the second transistor 462 is connected to an output end of a charging controller 45.

A source and a drain of a third transistor 463 are connected to the battery 43 and the system 42 respectively, and a gate of the third transistor 463 is connected to a first control module 4631.

Two signal input ends of the logical switch 44 are connected to an output end of a first comparator 481 and an output end of a second comparator 482 respectively, a first line selection end of the logical switch is connected to an output end of a first amplifier 471, and a second line selection end is connected to a switch-on control end 441.

Three input ends of the charging controller 45 are connected to an output end of a second amplifier 472, an output end of a third amplifier 473 and an output end of a fourth amplifier 474 respectively.

The charging and power supplying circuit further includes an adder 49, where a voltage of the power supplying tributary 401 is input to a first input end 4011 of the adder 49, a voltage of the charging tributary 402 is input to a second input end 4021, and an output of the adder 49 is a sum of the voltage of the power supplying tributary 401 and the voltage of the charging tributary 402.

A first preset level is input to an anode of an input end of the first amplifier 471, and a cathode of the input end of the first amplifier 471 is connected to the output end of the adder 49 and the sum of the voltage of the power supplying tributary 401 and the voltage of the charging tributary 402 is input to the cathode.

A second preset level is input to an anode of an input end of the second amplifier 472, and a cathode of the input end of the second amplifier 472 is connected to the output end of the adder 49 and the sum of the voltage of the power supplying tributary 401 and the voltage of the charging tributary 402 is input to the cathode.

The voltage of the charging tributary 402 is input to a cathode of an input end of the third amplifier 473, and a third preset level is input to an anode of the input end of the third amplifier 473.

A component voltage of the battery 43 is input to a cathode of an input end of the fourth amplifier 474, and a fourth preset level is input to an anode of the input end of the fourth amplifier 474. In a practical circuit, the voltage of the battery 43 is generally high. A high voltage tends to damage the fourth amplifier 474. Therefore, multiple voltage divider resistors may be connected in parallel to obtain low component voltages.

An anode of an input end of the first comparator 481 is connected to the output end of the adder 49 and the sum of the voltage of the power supplying tributary 401 and the voltage of the charging tributary 402 is input to the anode, and a fifth preset level is input to a cathode of the input end of the first comparator 481.

A sixth preset level is input to an anode of an input end of the second comparator 482, and a cathode of the input end of the second comparator 482 is connected to the second input end of the adder 49 and the voltage of the charging tributary 402 is input to the cathode.

The logical switch 44 makes a judgment according to logical signals input from the signal input ends, and then the logical switch 44 can connect the gate of the first transistor 461 to the output end of the first amplifier 471 or the switch-on control end 441 according to a judgment result, thereby controlling the first transistor 461 to be in a current-limited state or a fully switched-on state. The fully switched-on state means that the first transistor is switched on in a lowest on-resistance state and that the second line selection end of the logical switch 44 is connected to the switch-on control end 441. Specifically, when the first transistor 461 is a PMOS (P-channel field-effect transistor), the switch-on control end 441 has a low level. The low level refers to a voltage lower than a difference between the voltage of the power supply 41 and the switch-on threshold voltage of the first transistor 461, and the low level may further include a ground level. When the first transistor 461 is an NMOS (N-channel field-effect transistor), the switch-on control end 441 has a switch-on level, and the switch-on level refers to a voltage higher than a sum of a rated voltage of the system 42 and a switch-on threshold voltage of the first transistor 461. The switch-on control end 441 is connected to the gate of the first transistor 461 to make the first transistor 461 reach the switch-on threshold voltage, thereby controlling the first transistor 461 to be in a fully switched-on state. The first control module 4631 connected to the gate of the third transistor 463 is configured to judge whether a power supply is connected to the charging and power supplying circuit, and control switch-on/off of the third transistor 463 according to a judgment result. The first control module 4631 may be any module capable of implementing the foregoing function in the prior art. The first to sixth preset levels may be set by a person, and the first, second and fifth preset levels are all greater than the sixth preset level. In a practical circuit, components of various types are different from each other, and components of the same type may also differ from each other. Therefore, the first to sixth preset levels may differ from each other. In the embodiment of the present invention, the first amplifier 471, the second amplifier 472 and the first comparator 481 each have an input end for inputting the sum of the voltage of the power supplying tributary 401 and the voltage of the charging tributary 402. Preferably, the first, second and fifth preset levels may be equal to a voltage corresponding to a maximum output current limit of the power supply 41, thereby reducing the number of the preset levels and lowering the complexity of the circuit. In the following embodiments, illustration is made with an example where the first, second and fifth preset levels are equal to the voltage corresponding to the maximum output current limit of the power supply 41.

With such a charging and power supplying circuit, in a process of supplying power to the system, when the sum of the voltage of the power supplying tributary 401 and the voltage of the charging tributary 402 is less than the fifth preset level, the second line selection end of the logical switch 44 connected to the switch-on control end 441 is connected to the gate of the first transistor 461, thereby making the first transistor 461 in the fully switched-on state; when the sum of the voltage of the power supplying tributary 401 and the voltage of the charging tributary 402 is equal to the first preset level and less than the sixth preset level, the first line selection end of the logical switch 44 connected to the output end of the first amplifier 471 is connected to the gate of the first transistor 461, so that power is supplied to the system at a limited current. In a process of charging the battery, when the sum of the voltage of the power supplying tributary 401 and the voltage of the charging tributary 402 is not equal to the second preset level, the charging controller 45 controls the second transistor 462 to be on, and the charging controller 45 controls the battery 43 to undergo charging at a constant current and a constant voltage, according to a current signal of the charging tributary 402 fed back by the third amplifier 473 and a voltage signal of the charging tributary 402 fed back by the fourth amplifier 474; when the sum of the voltage of the power supplying tributary 401 and the voltage of the charging tributary 402 is equal to the second preset level, the charging controller 45 controls switch-off of the second transistor 462, and the battery charging is ended.

In this way, the first transistor is a current-limiting switch for system power supplying. In comparison with the prior art in which the current-limiting switch is located in a trunk of the charging and power supplying circuit, the first transistor of the charging and power supplying circuit provided by the embodiment of the present invention is located in the power supplying tributary of the system, so that a current on the current-limiting switch reduces to a current of the power supplying tributary of the system. Because the first transistor is switched on in the lowest on-resistance state, the resistance of the first transistor is tiny in comparison with a load resistance, the power supplying loss of the system is only the loss of the power supplying current of the system on the first transistor, and the efficiency of system power supplying approximates 100%. Meanwhile, because the loss of the charging tributary of the battery is fully the loss on the switch circuit, and the loss on the switch circuit itself is tiny, the efficiency is very high. Therefore, in comparison with the existing solutions, both the efficiency of system power supplying and the efficiency of battery charging are improved significantly.

Figure 5:
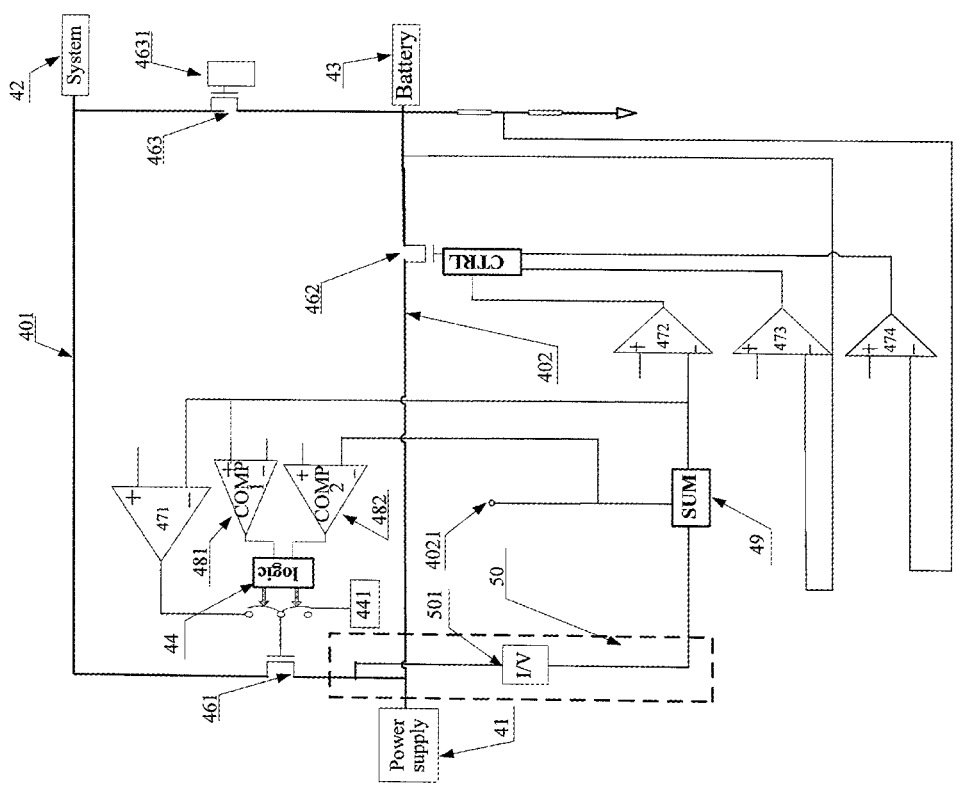
FIG. 5 is a schematic connection diagram of another charging and power supplying circuit provided in an embodiment of the present invention.

Further, as shown in FIG. 5, the charging and power supplying circuit may further include a power supplying voltage detecting module 50 configured to detect a voltage of the power supplying tributary. An output end of the power supplying voltage detecting module 50 is connected to the first input end 4011 of the adder 49. An input end of the power supplying voltage detecting module 50 is connected to at least one of the source and the drain of the first transistor 461.

Specifically, the power supplying voltage detecting module 50 configured to detect the voltage of the power supplying tributary may be connected in the following six schemes.

Scheme 1: As shown in FIG. 5, the power supplying voltage detecting module 50 may include:

a first I/V converter 501, where an input end of the first I/V converter 501 is connected to the source or the drain of the first transistor 461 and a current of the power supplying tributary 401 is input to the input end, and an output end of the first I/V converter 501 is the output end of the power supplying voltage detecting module 50.

In this way, a current signal of the source or the drain of the first transistor 461 can be quickly and directly converted by the first I/V converter 501 into a power supplying voltage, which reduces the implementation difficulty of circuit design.

Figure 6:
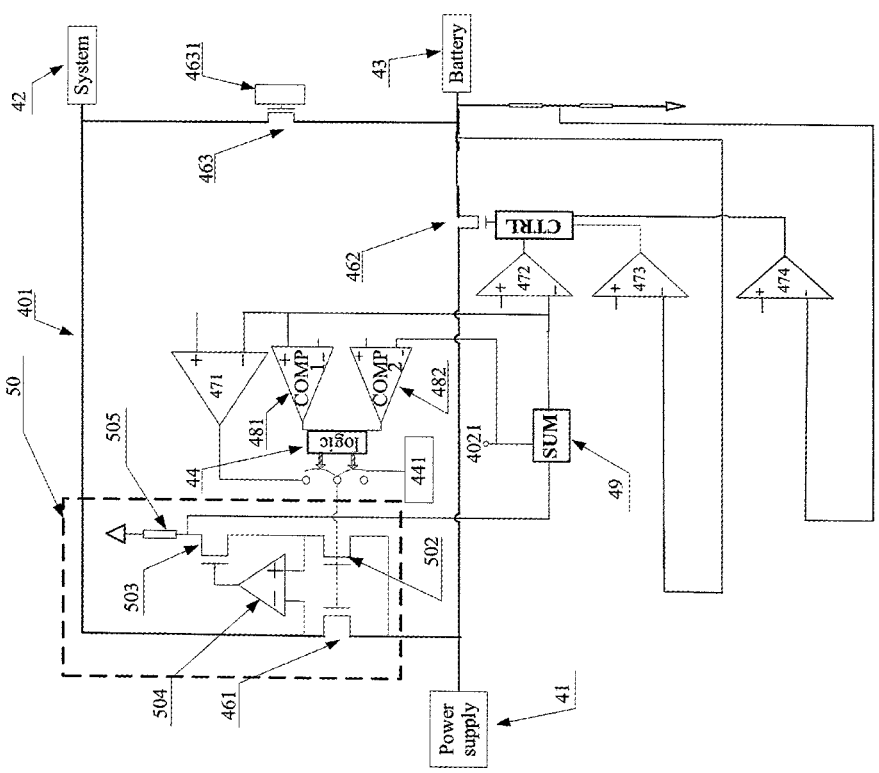
FIG. 6 is a schematic connection diagram of another charging and power supplying circuit provided in an embodiment of the present invention.

Scheme 2: As shown in FIG. 6, the power supplying voltage detecting module 50 may further include:

a fourth transistor 502, where a source of the fourth transistor 502 is connected to the source of the first transistor 461, and a gate is connected to the gate of the first transistor 461;

a fifth transistor 503, where a source of the fifth transistor 503 is connected to a drain of the fourth transistor 502;

an operational amplifier 504, where an anode of an input end of the operational amplifier 504 is connected to the drain of the fourth transistor 502, a cathode of the input end is connected to the drain of the first transistor 461, and an output end is connected to a gate of the fifth transistor 503; and a voltage divider resistor 505, where a first end of the voltage divider resistor 505 is connected to a drain of the fifth transistor 503 and a second end is grounded, and the first end of the voltage divider resistor 505 is the output end of the power supplying voltage detecting module 50.

With such a circuit, the fourth transistor 502 can precisely mirror a current of the first transistor 461 through the operational amplifier 504 to accurately obtain a source voltage and a drain voltage of the first transistor 461 and measure the voltages on the voltage divider resistor 505, thereby precisely detecting the power supplying voltage, where the power supplying voltage is a voltage corresponding to the current of the power supplying tributary.

Figure 7:
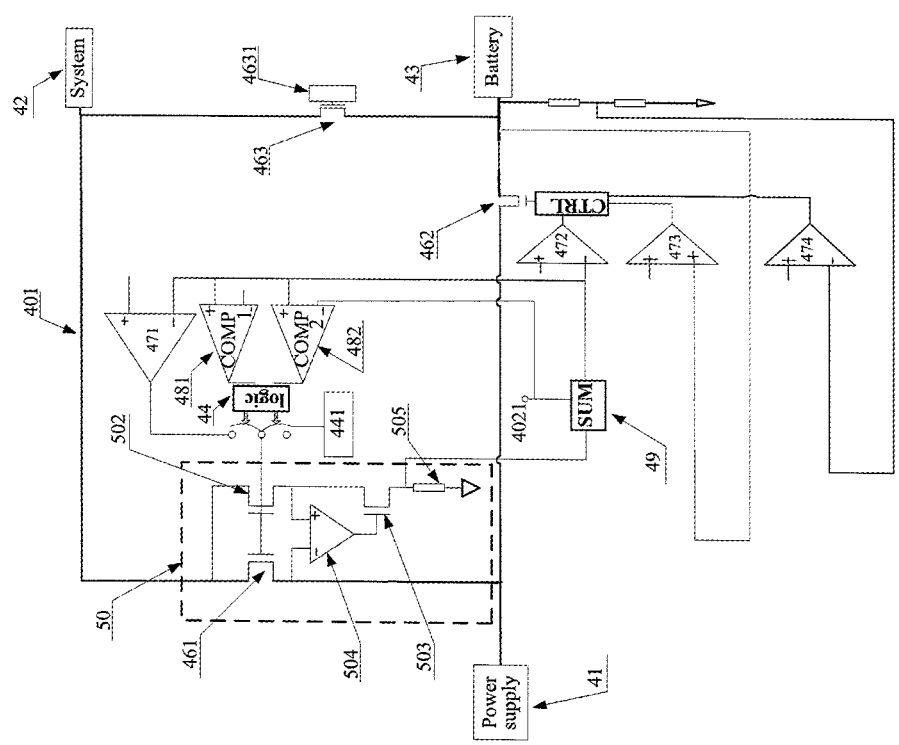
FIG. 7 is a schematic connection diagram of another charging and power supplying circuit provided in an embodiment of the present invention.

Scheme 3: As shown in FIG. 7, the power supplying voltage detecting module 50 may further include:

a fourth transistor 502, where a drain of the fourth transistor 502 is connected to the drain of the first transistor 461, and a gate is connected to the gate of the first transistor 461;

a fifth transistor 503, where a source of the fifth transistor 503 is connected to a source of the fourth transistor 502;

an operational amplifier 504, where an anode of an input end of the operational amplifier 504 is connected to the source of the fourth transistor 502 and a cathode of the input end is connected to the source of the first transistor 461, and an output end is connected to a gate of the fifth transistor 503; and a voltage divider resistor 505, where a first end of the voltage divider resistor 505 is connected to a drain of the fifth transistor 503 and a second end is grounded, and the first end of the voltage divider resistor 505 is the output end of the power supplying voltage detecting module 50.

Compared with Scheme 2, the first transistor 461 and the fourth transistor 502 in Scheme 3 have, except for gates and clamped ends, another common end connected to the system instead of the power supply. Such a connection manner produces the same beneficial effect as Scheme 2.

Figure 8:
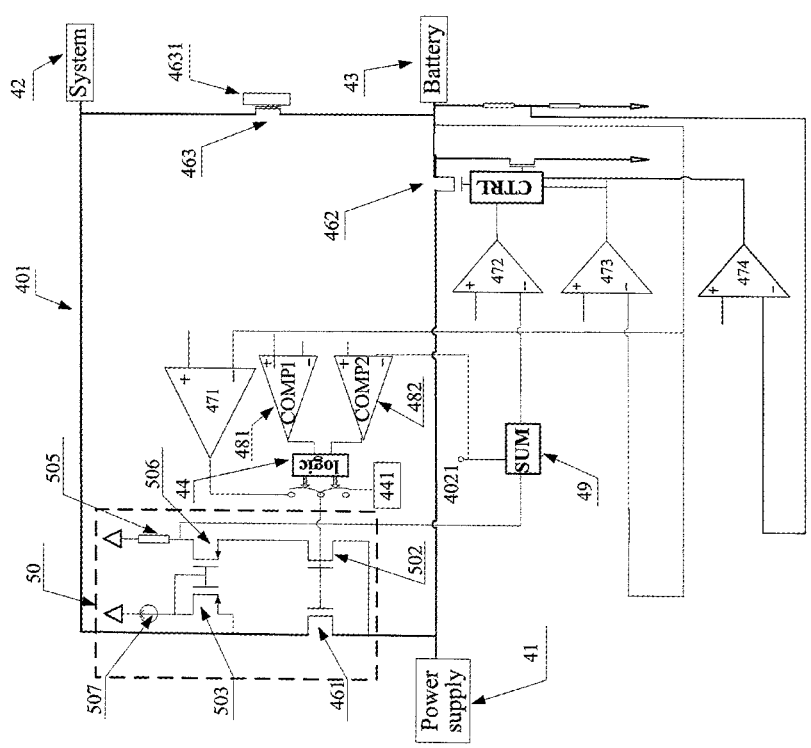
FIG. 8 is a schematic connection diagram of another charging and power supplying circuit provided in an embodiment of the present invention.

Scheme 4: As shown in FIG. 8, the power supplying voltage detecting module 50 may further include:

a fourth transistor 502, where a source of the fourth transistor 502 is connected to the source of the first transistor 461, and a gate is connected to the gate of the first transistor 461;

a fifth transistor 503, where a source of the fifth transistor 503 is connected to the drain of the first transistor 461;

a sixth transistor 506, where a source of the sixth transistor 506 is connected to a drain of the fourth transistor 502, and a gate is connected to a gate of the fifth transistor 503;

a current source 507, where a first end of the current source 507 is connected to a drain and the gate of the fifth transistor 503 and a second end is grounded; and a voltage divider resistor 505, where a first end of the voltage divider resistor 505 is connected to a drain of the sixth transistor 506 and a second end is grounded, and the first end of the voltage divider resistor 505 is the output end of the power supplying voltage detecting module 50.

In this scheme, a simple voltage following circuit is used to make the source voltage of the sixth transistor 506 follow the source voltage of the fifth transistor 503, thereby ensuring that voltages on three ends of the first transistor 461 and three ends of the fourth transistor 502 are equal and making the detection of the power supplying voltage more precise.

Figure 9:
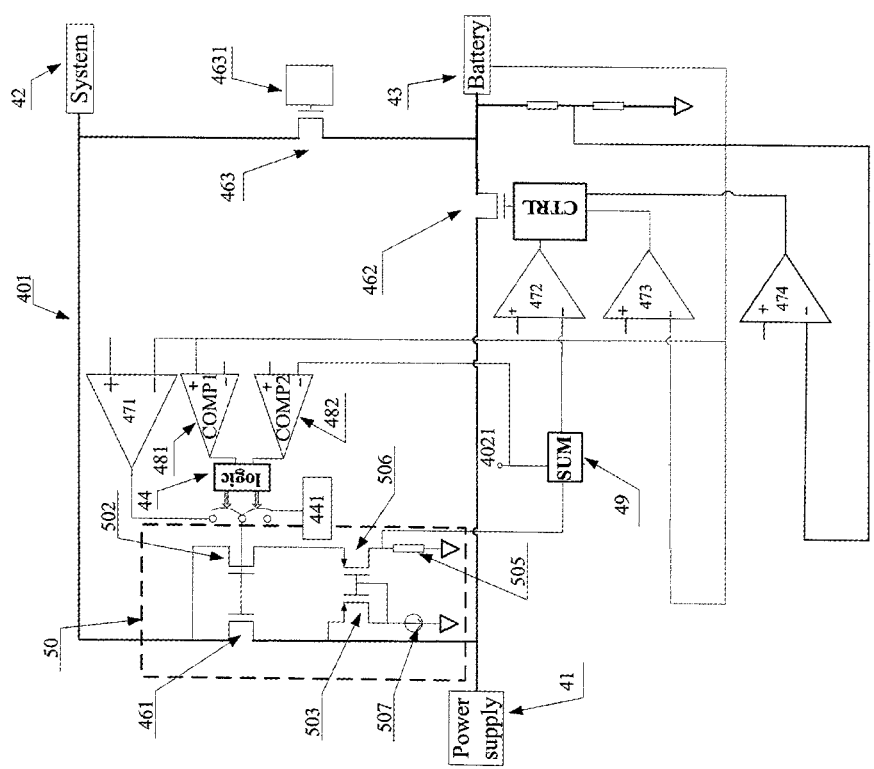
FIG. 9 is a schematic connection diagram of another charging and power supplying circuit provided in an embodiment of the present invention.

Scheme 5: As shown in FIG. 9, the power supplying voltage detecting module 50 may further include:

a fourth transistor 502, where a drain of the fourth transistor 502 is connected to the drain of the first transistor 461, and a gate is connected to the gate of the first transistor 461;

a fifth transistor 503, where a source of the fifth transistor 503 is connected to the source of the first transistor 461;

a sixth transistor 506, where a source of the sixth transistor 506 is connected to a source of the fourth transistor 502, and a gate is connected to a gate of the fifth transistor 503;

a current source 507, where a first end of the current source 507 is connected to a drain and the gate of the fifth transistor 503 and a second end is grounded; and a voltage divider resistor 505, where a first end of the voltage divider resistor 505 is connected to a drain of the sixth transistor 506 and a second end is grounded, and the first end of the voltage divider resistor 505 is the output end of the power supplying voltage detecting module 50.

Compared with Scheme 4, the first transistor 461 and the fourth transistor 502 in Scheme 5 have, except for the gates and clamped ends, another common end connected to the system instead of the power supply. Such a connection manner produces the same beneficial effect as Scheme 4.

Figure 10:
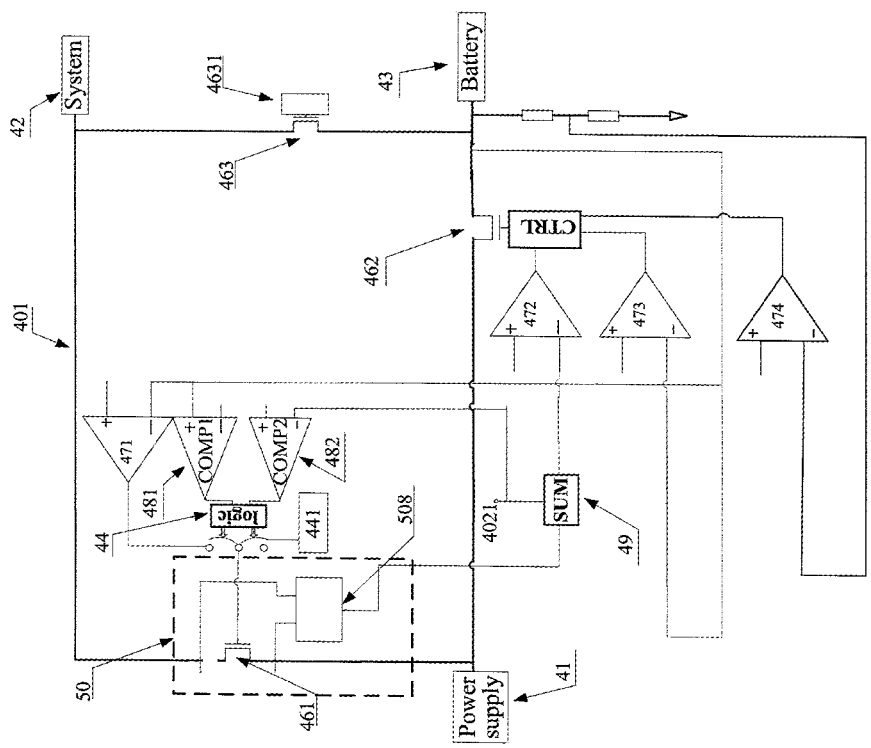
FIG. 10 is a schematic connection diagram of another charging and power supplying circuit provided in an embodiment of the present invention.

Scheme 6: As shown in FIG. 10, the power supplying voltage detecting module 50 may further include:

a first voltage difference amplifying module 508, where a first input end of the first voltage difference amplifying module 508 is connected to the source of the first transistor 461, and a second input end is connected to the drain of the first transistor 461, and an output end of the first voltage difference amplifying module 508 is the output end of the power supplying voltage detecting module 50.

In this scheme, a method of directly detecting a voltage difference between the source and the drain of the first transistor 461 is adopted, and then the voltage difference is amplified through the first voltage difference amplifying module 508. In this way, the power supplying voltage can be detected quickly and conveniently. The power supplying voltage is the voltage corresponding to the current of the power supplying tributary.

Figure 11:
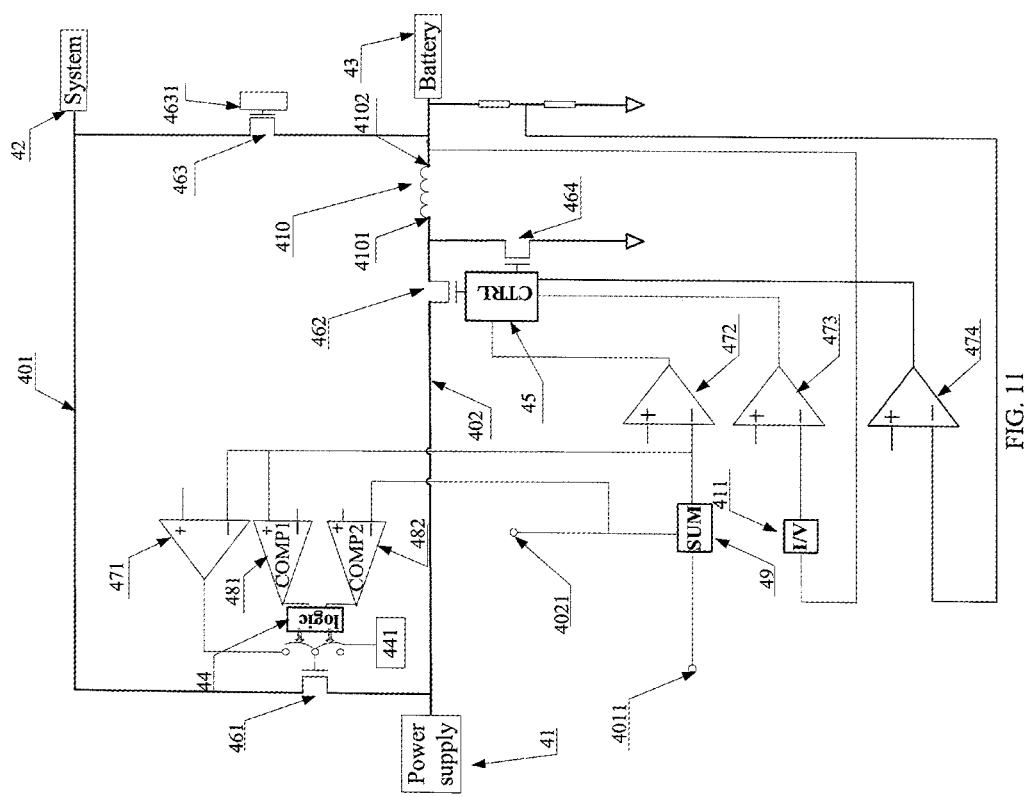
FIG. 11 is a schematic connection diagram of another charging and power supplying circuit provided in an embodiment of the present invention.

In the charging and power supplying circuit provided in the embodiment of the present invention, as shown in FIG. 11, an inductor 410 is further connected to the charging tributary, where a first end 4101 of the inductor 410 is connected to the drain of the second transistor 462, and a second end of the inductor 410 is connected to the battery 43.

The first end 4101 of the inductor 410 is grounded through a seventh transistor 464; and a drain of the seventh transistor is connected to the first end 4101 of the inductor 410, a source is grounded, and a gate is connected to the output end of the charging controller 45.

The first end 4101 of the inductor 410 is grounded through the seventh transistor 464. Meanwhile, the charging controller 45 controls switch-on/off of the seventh transistor 464. Specifically, when the second transistor 462 is switched on, the seventh transistor 464 is switched off; when the second transistor 462 is switched off, the seventh transistor 464 is switched on. When charging of the battery is ended, the second transistor 462 is switched off, the seventh transistor 464 is switched off, and the charging of the battery is ended.

Further, as shown in FIG. 11, the charging and power supplying circuit further includes:

a second I/V converter 411, where an input end of the second I/V converter 411 is connected to the second end 4102 of the inductor 410 and a current of the charging tributary 402 is input to the input end, and an output end of the second I/V converter 411 is connected to the cathode of the input end of the third amplifier 473.

In this way, the current of the charging tributary 402 is converted, through the second I/V converter 411, into a voltage signal, the third preset level is input to the anode of the input end of the third amplifier 473, and when the voltage signal is equal to the third preset level, the charging controller 45 controls constant-current charging of the battery 43 by using a current corresponding to the third preset level value as a standard. When the voltage signal is not equal to the third preset level, the charging controller 45 controls the current of the charging tributary 402 to change toward the current corresponding to the third preset level value. Further, the voltage of the charging tributary, which is input to the second input end of the adder 49, may be obtained in the following three circuit connection schemes.

Figure 12:
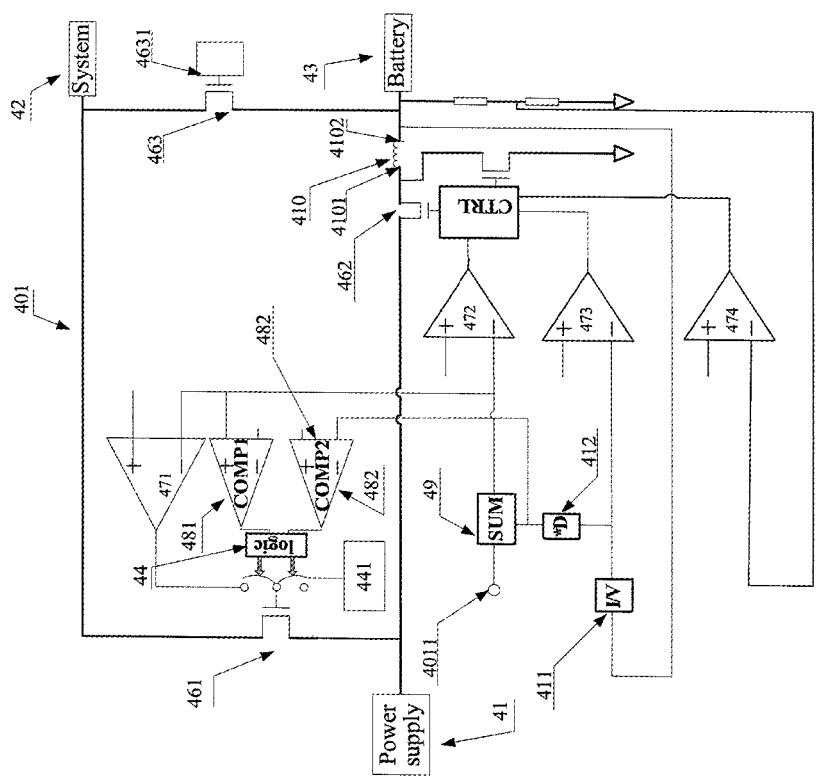
FIG. 12 is a schematic connection diagram of another charging and power supplying circuit provided in an embodiment of the present invention.

Scheme 1: As shown in FIG. 12, the charging and power supplying circuit may include:

a duty ratio generator 412, where an input end of the duty ratio generator 412 is connected to the output end of the second I/V converter 411 and the voltage of the charging tributary 402 is input to the input end, and an output end of the duty ratio generator 412 is connected to the second input end of the adder 49 and to the cathode of the input end of the second comparator 482.

In a practical circuit, the duty ratio generator 412 may be a multiplier in an analog circuit, and the voltage input to the duty ratio generator 412 may be multiplied by a duty ratio to obtain a voltage signal that has the duty ratio. In this way, a current output from the second end 4102 of the inductor 410 is first converted, through the second I/V converter 411, into a voltage corresponding to the current, and then multiplied by a specific duty ratio to recover the voltage of the charging tributary properly. The duty ratio generator 412 outputs the obtained voltage of the charging tributary to the second input end of the adder.

Figure 13:
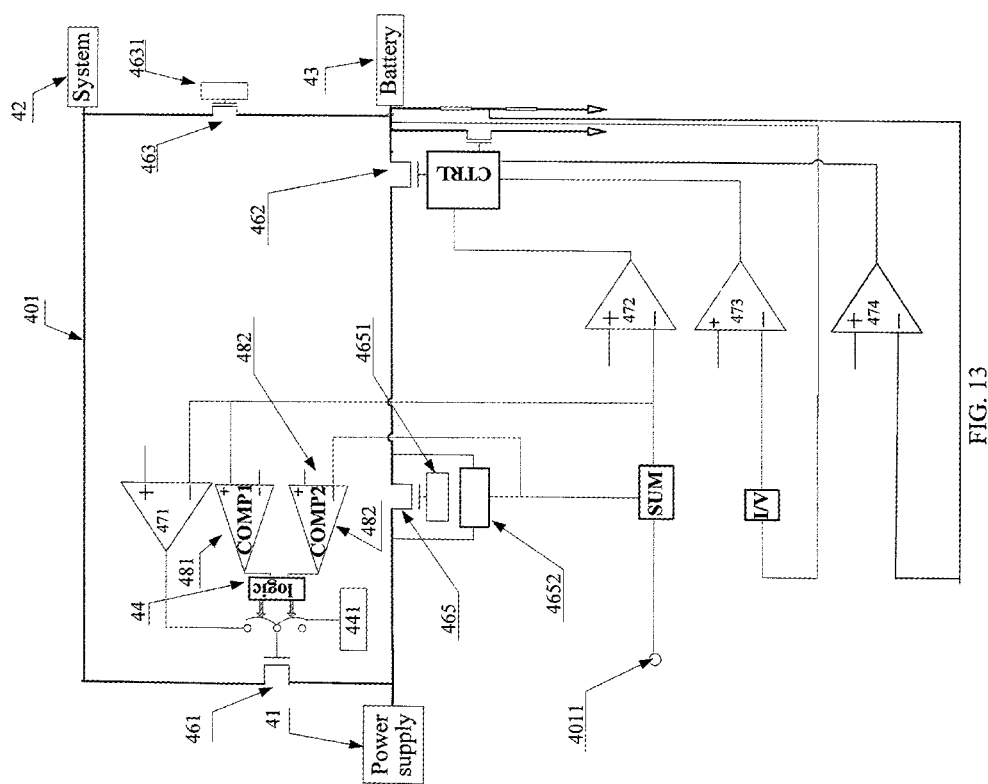
FIG. 13 is a schematic connection diagram of another charging and power supplying circuit provided in an embodiment of the present invention.

Scheme 2: As shown in FIG. 13, an eighth transistor 465 may further be connected to the charging tributary, where a source of the eighth transistor 465 is connected to the power supply 41, a drain is connected to the source of the second transistor 462, and a gate is connected to a second control module 4651.

The charging and power supplying circuit further includes: a current sensor 4652, where a first input end and a second input end of the current sensor 4652 are connected to the source and the drain of the eighth transistor 465 respectively, and an output end of the current sensor 4652 is connected to the second input end of the adder 49 and to the cathode of the input end of the second comparator 482.

The second control module 4651 controls the eighth transistor 465 to be in a switch-on state when the battery is charged. The second control module 4651 may be any element capable of implementing the foregoing function in the prior art. Specifically, the current sensor 4652 may be a transistor switch connected in parallel with the eighth transistor 465. In this way, a voltage between the source and the drain of the eighth transistor 465, namely, the voltage of the charging tributary 402, may be obtained through measuring by the current sensor 4652, and the current sensor 4652 outputs the detected voltage 4021 of the charging tributary to the second input end of the adder.

Figure 14:
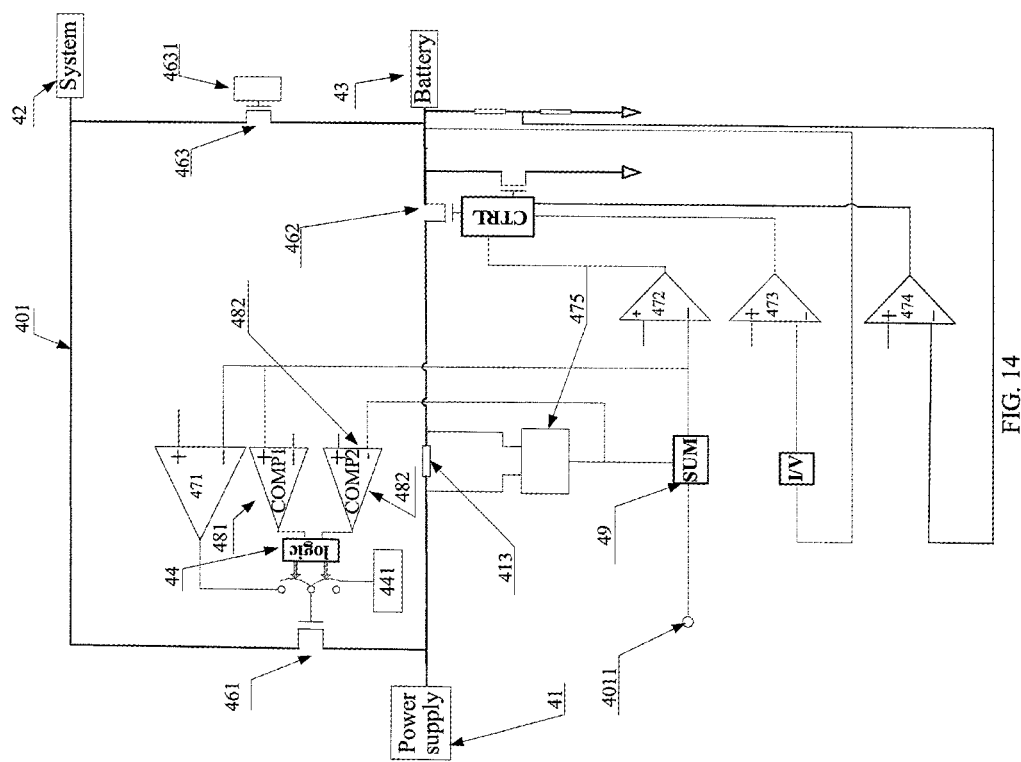
FIG. 14 is a schematic connection diagram of another charging and power supplying circuit provided in an embodiment of the present invention.

Scheme 3: As shown in FIG. 14, a detection resistor 413 may further be connected to the charging tributary, where a first end of the charging tributary is connected to the power supply 41, and a second end is connected to the source of the second transistor 462.

The charging and power supplying circuit further includes a second voltage difference amplifying module 475, where a first input end and a second input end of the second voltage difference amplifying module 475 are connected to the first end and the second end of the detection resistor 413 respectively, and an output end of the second voltage difference amplifying module 475 is connected to the second input end of the adder 49 and to the cathode of the input end of the second comparator 482.

Compared with Scheme 2, this scheme uses a detection resistor 413 in place of the eighth transistor 465. In a practical circuit, because a resistance value of the resistor 413 is small, voltages on both ends of the resistor 413 are generally low. The second voltage difference amplifying module 475 is connected in parallel with the resistor 413 to amplify the voltages on both ends of the resistor 413 to obtain the voltage of the charging tributary 402. The two schemes have similar structures and same functions. Both schemes can obtain the voltage of the charging tributary precisely. The voltage of the charging tributary is a voltage corresponding to the current of the charging tributary.

It should be noted that, the charging and power supplying circuit provided in the embodiment of the present invention may include any one of the foregoing six connection schemes of the power supplying voltage detecting module, and any one of the foregoing three schemes of voltage detection of the charging tributary. In addition, the charging controller may be any one of a switch charger, a linear charger and a pulse charger.

An application device of a charging and power supplying circuit provided in an embodiment of the present invention includes any charging and power supplying circuit described above.

Through the application device of the charging and power supplying circuit provided in the embodiment of the present invention, in the charging and power supplying circuit, the logical switch selects a line according to the voltage of the power supplying tributary and the voltage of the charging tributary, and controls the first transistor to be in a fully switched-on state or a current-limited state; the charging controller selects, according to the sum of the voltage of the power supplying tributary and the voltage of the charging tributary, switch-on/off of the second transistor to control the current of the charging tributary. In this way, the first transistor is a current-limiting switch for system power supplying. In comparison with the prior art in which the current-limiting switch is located in a trunk of the charging and power supplying circuit, the first transistor of the charging and power supplying circuit provided by the embodiment of the present invention is located in the power supplying tributary of the system, so that a current on the current-limiting switch reduces to a current of the power supplying tributary of the system. Because the first transistor is switched on in a lowest on-resistance state, the resistance of the first transistor is tiny in comparison with a load resistance, the power supplying loss of the system is only the loss of the power supplying current of the system on the first transistor, and the efficiency of system power supplying approximates 100%. Meanwhile, because the loss of the charging tributary of the battery is fully the loss on the switch circuit, and the loss on the switch circuit itself is tiny, the efficiency is very high. Therefore, in comparison with the existing solutions, both the efficiency of system power supplying and the efficiency of battery charging are improved significantly.

As shown in FIG. 15, a charging and power supplying method provided in an embodiment of the present invention includes the following steps.

S1501: When a first comparator finds, through comparison, that a sum of a voltage of a power supplying tributary and a voltage of a charging tributary is less than a fifth preset level, the first comparator and a second comparator control a second line selection end of a logical switch to connect a gate of a first transistor to make the first transistor fully switched on; and meanwhile, when a voltage signal at a cathode of an input end of a second amplifier is less than a second preset level at an anode of the input end, a charging controller controls, according to output signals of a third amplifier and a fourth amplifier, a battery to undergo charging at a constant voltage and a constant current.

S1502: When the first comparator finds, through comparison, that the sum of the voltage of the power supplying tributary and the voltage of the charging tributary is greater than or equal to the fifth preset level and meanwhile, the voltage signal at the cathode of the input end of the second amplifier is greater than or equal to the second preset level at the anode of the input end, the second amplifier controls the charging controller to gradually decrease a charging current of the battery.

S1503: When the second comparator finds, through comparison, that the voltage of the charging tributary is less than or equal to a sixth preset level, the first comparator and the second comparator control a first line selection end of the logical switch to connect the gate of the first transistor, so as to limit a power supplying current of a system to a maximum output current limit.

Through the charging and power supplying method provided in the embodiment of the present invention, in the charging and power supplying circuit, the logical switch selects a line according to the voltage of the power supplying tributary and the voltage of the charging tributary, and controls the first transistor to be in a fully switched-on state or a current-limited state; the charging controller selects, according to the sum of the voltage of the power supplying tributary and the voltage of the charging tributary, switch-on/off of the second transistor to control the current of the charging tributary. In this way, the first transistor is a current-limiting switch for system power supplying. In comparison with the prior art in which the current-limiting switch is located in a trunk of the charging and power supplying circuit, the first transistor of the charging and power supplying circuit provided by the embodiment of the present invention is located in the power supplying tributary of the system, so that a current on the current-limiting switch reduces to a current of the power supplying tributary of the system. Because the first transistor is switched on in a lowest on-resistance state, the resistance of the first transistor is tiny in comparison with a load resistance, the power supplying loss of the system is only the loss of the power supplying current of the system on the first transistor, and the efficiency of system power supplying approximates 100%. Meanwhile, because the loss of the charging tributary of the battery is fully the loss on the switch circuit, and the loss of the switch circuit itself is tiny, the efficiency is very high. Therefore, in comparison with the existing solutions, both the efficiency of system power supplying and the efficiency of battery charging are improved significantly.

The above descriptions are merely specific implementation manners of the present invention, but not intended to limit the protection scope of the present invention. Any variation or replacement that can be easily derived by persons skilled in the art within the technical scope disclosed in the present invention shall fall within the protection scope of the present invention. Therefore, the protection scope of the present invention is subject to the appended claims.

What is claimed is:

1. A charging and power supplying circuit, comprising: a power supplying tributary and a charging tributary, wherein an end of the power supplying tributary is connected to a power supply, and another end is connected to a system; an end of the charging tributary is connected to the power supply, and another end is connected to a battery;
   a first transistor is connected to the power supplying tributary, and a source and a drain of the first transistor are connected to the power supplying tributary, and a gate of the first transistor is connected to a line selection end of a logical switch;
   a second transistor is connected to the charging tributary, and a source and a drain of the second transistor are connected to the charging tributary, and a gate of the second transistor is connected to an output end of a charging controller;
   a source and a drain of a third transistor are connected to the battery and the system respectively, and a gate of the third transistor is connected to a first control module;
   two signal input ends of the logical switch are connected to an output end of a first comparator and an output end of a second comparator respectively, a first line selection end of the logical switch is connected to an output end of a first amplifier, and a second line selection end is connected to a switch-on control end;
   three input ends of the charging controller are connected to an output end of a second amplifier, an output end of a third amplifier and an output end of a fourth amplifier respectively;
   the charging and power supplying circuit further comprises an adder; a voltage of the power supplying tributary is input to a first input end of the adder, a voltage of the charging tributary is input to a second input end, and an output of the adder is a sum of the voltage of the power supplying tributary and the voltage of the charging tributary;
   a first preset level is input to an anode of an input end of the first amplifier, and a cathode of the input end of the first amplifier is connected to the output end of the adder and the sum of the voltage of the power supplying tributary and the voltage of the charging tributary is input to the cathode;
   a second preset level is input to an anode of an input end of the second amplifier, and a cathode of the input end of the second amplifier is connected to the output end of the adder and the sum of the voltage of the power supplying tributary and the voltage of the charging tributary is input to the cathode;
   the voltage of the charging tributary is input to a cathode of an input end of the third amplifier, and a third preset level is input to an anode of the input end of the third amplifier;
   a component voltage of the battery is input to a cathode of an input end of the fourth amplifier, and a fourth preset level is input to an anode of the input end of the fourth amplifier;
   an anode of an input end of the first comparator is connected to the output end of the adder and the sum of the voltage of the power supplying tributary and the voltage of the charging tributary is input to the anode, and a fifth preset level is input to a cathode of the input end of the first comparator; and
   a sixth preset level is input to an anode of an input end of the second comparator, and a cathode of the input end of the second comparator is connected to the second input end of the adder and the voltage of the charging tributary is input to the cathode.

2. The charging and power supplying circuit according to claim 1, wherein the charging and power supplying circuit further comprises a power supplying voltage detecting module; and
   an output end of the power supplying voltage detecting module is connected to the first input end of the adder, and an input end of the power supplying voltage detecting module is connected to at least one of the source and the drain of the first transistor.

3. The charging and power supplying circuit according to claim 2, wherein the power supplying voltage detecting module comprises:
   a first I/V converter, wherein and input end of the first I/V converter is connected to the source or the drain of the first transistor and a current of the power supplying tributary is input to the input end, and the output end of the first I/V converter is the output end of the power supplying voltage detecting module.

4. The charging and power supplying circuit according to claim 2, wherein the power supplying voltage detecting module comprises:

a fourth transistor, wherein a source of the fourth transistor is connected to the source of the first transistor, and a gate is connected to the gate of the first transistor;

a fifth transistor, wherein a source of the fifth transistor is connected to a drain of the fourth transistor;

an operational amplifier, wherein an anode of an input end of the operational amplifier is connected to the drain of the fourth transistor, a cathode of the input end is connected to the drain of the first transistor, and an output end is connected to a gate of the fifth transistor; and a voltage divider resistor, wherein a first end of the voltage divider resistor is connected to a drain of the fifth transistor and a second end is grounded, and the first end of the voltage divider resistor is the output end of the power supplying voltage detecting module.

5. The charging and power supplying circuit according to claim 2, wherein the power supplying voltage detecting module comprises:

a fourth transistor, wherein a drain of the fourth transistor is connected to the drain of the first transistor, and a gate is connected to the gate of the first transistor;

a fifth transistor, wherein a source of the fifth transistor is connected to a source of the fourth transistor;

an operational amplifier, wherein an anode of an input end of the operational amplifier is connected to the source of the fourth transistor, a cathode of the input end is connected to the source of the first transistor, and an output end is connected to a gate of the fifth transistor; and a voltage divider resistor, wherein a first end of the voltage divider resistor is connected to a drain of the fifth transistor and a second end is grounded, and the first end of the voltage divider resistor is the output end of the power supplying voltage detecting module.

6. The charging and power supplying circuit according to claim 2, wherein the power supplying voltage detecting module comprises:

a fourth transistor, wherein a source of the fourth transistor is connected to the source of the first transistor, and a gate is connected to the gate of the first transistor;

a fifth transistor, wherein a source of the fifth transistor is connected to the drain of the first transistor;

a sixth transistor, wherein a source of the sixth transistor is connected to a drain of the fourth transistor, and a gate is connected to a gate of the fifth transistor;

a current source, wherein a first end of the current source is connected to a drain and the gate of the fifth transistor, and a second end is grounded; and a voltage divider resistor, wherein a first end of the voltage divider resistor is connected to a drain of the sixth transistor and a second end is grounded, and the first end of the voltage divider resistor is the output end of the power supplying voltage detecting module.

7. The charging and power supplying circuit according to claim 2, wherein the power supplying voltage detecting module comprises:

a fourth transistor, wherein a drain of the fourth transistor is connected to the drain of the first transistor, and a gate is connected to the gate of the first transistor;

a fifth transistor, wherein a source of the fifth transistor is connected to the source of the first transistor;

a sixth transistor, wherein a source of the sixth transistor is connected to a source of the fourth transistor, and a gate is connected to a gate of the fifth transistor;

a current source, wherein a first end of the current source is connected to a drain and the gate of the fifth transistor, and a second end is grounded; and a voltage divider resistor, wherein a first end of the voltage divider resistor is connected to a drain of the sixth transistor and a second end is grounded, and the first end of the voltage divider resistor is the output end of the power supplying voltage detecting module.

8. The charging and power supplying circuit according to claim 2, wherein the power supplying voltage detecting module comprises:

a first voltage difference amplifying module, wherein a first input end of the first voltage difference amplifying module is connected to the source of the first transistor, and a second input end is connected to the drain of the first transistor, and the output end of the first voltage difference amplifying module is the output end of the power supplying voltage detecting module.

9. The charging and power supplying circuit according to claim 1, wherein an inductor is connected to the charging tributary, and a first end of the inductor is connected to the drain of the second transistor, and a second end of the inductor is connected to the battery; and the first end of the inductor is grounded through a seventh transistor; and a source of the seventh transistor is connected to the first end of the inductor, a drain is grounded, and a gate is connected to the output end of the charging controller.

10. The charging and power supplying circuit according to claim 9, wherein the charging and power supplying circuit further comprises:

a second I/V converter, wherein an input end of the second I/V converter is connected to the second end of the inductor and a current of the charging tributary is input to the input end, and an output end of the second I/V converter is connected to the cathode of the input end of the third amplifier.

11. The charging and power supplying circuit according to claim 10, wherein the charging and power supplying circuit further comprises:

a duty ratio generator, wherein an input end of the duty ratio generator is connected to the output end of the second I/V converter and the voltage of the charging tributary is input to the input end, and an output end of the duty ratio generator is connected to the second input end of the adder and to the cathode of the input end of the second comparator.

12. The charging and power supplying circuit according to claim 10, wherein an eighth transistor is connected to the charging tributary, and a source of the eighth transistor is connected to the power supply, a drain is connected to the source of the second transistor, and a gate is connected to a second control module; and the charging and power supplying circuit further comprises a current sensor, and a first input end and a second input end of the current sensor are connected to the source and the drain of the eighth transistor respectively, and an output end of the current sensor is connected to the second input end of the adder and to the cathode of the input end of the second comparator.

13. The charging and power supplying circuit according to claim 10, wherein a detection resistor is connected to the charging tributary, and a first end of the detection resistor is connected to the power supply, and a second end is connected to the source of the second transistor; and the charging and power supplying circuit further comprises a second voltage difference amplifying module, and a first input end and a second input end of the second voltage difference amplifying module are connected to the first end and the second end of the detection resistor, and an output end of the second voltage difference amplifying module is connected to the second input end of the adder and to the cathode of the input end of the second comparator.

14. The charging and power supplying circuit according to claim 1, wherein types of the charging controller comprise a switch charger, a linear charger and a pulse charger.

* * * * *